US008625162B2

(12) United States Patent
Yasuoka et al.

(10) Patent No.: US 8,625,162 B2
(45) Date of Patent: Jan. 7, 2014

(54) IMAGE PROCESSING APPARATUS AND IMAGE FORMING APPARATUS WITH A TONER DENSITY CORRECTION FUNCTION

(75) Inventors: Norihide Yasuoka, Osaka (JP); Masayuki Otsuka, Osaka (JP); Masaya Fujitani, Osaka (JP); Katsuhiro Nagayama, Osaka (JP); Takashi Kitagawa, Osaka (JP)

(73) Assignee: Sharp Kabushiki Kaisha, Osaka-Shi (JP)

( * ) Notice: Subject to any disclaimer, the term of this patent is extended or adjusted under 35 U.S.C. 154(b) by 280 days.

(21) Appl. No.: 13/169,964

(22) Filed: Jun. 27, 2011

(65) Prior Publication Data

US 2011/0317221 A1 Dec. 29, 2011

(30) Foreign Application Priority Data

Jun. 28, 2010 (JP) ................................ 2010-146314

(51) Int. Cl.
*H04N 1/405* (2006.01)
*G06K 15/00* (2006.01)

(52) U.S. Cl.
USPC .......................................... 358/3.06; 358/3.1

(58) Field of Classification Search
USPC ........ 358/3.06, 2.1, 3.1, 3.23–3.27, 518, 521, 358/534–536; 399/39, 53–62, 72
See application file for complete search history.

(56) References Cited

U.S. PATENT DOCUMENTS

2007/0097439 A1* 5/2007 Yamada ........................ 358/3.1

FOREIGN PATENT DOCUMENTS

| | | |
|---|---|---|
| JP | 2002-374416 | 12/2002 |
| JP | 2005-144883 | 6/2005 |
| JP | 2006-18180 A | 1/2006 |
| JP | 2006-110914 A | 4/2006 |
| JP | 2006-140859 | 6/2006 |

* cited by examiner

*Primary Examiner* — Barbara Reinier
(74) *Attorney, Agent, or Firm* — Nixon & Vanderhye P.C.

(57) ABSTRACT

An image processing section includes a density correction adjustment section, and in response to an instruction from a density correction process section to adjust a density correction process, the density correction adjustment section reviews a conversion value table which is used by the density correction process section to calculate an output correction value by conversion, so as to adjust the density correction process.

8 Claims, 10 Drawing Sheets

START
S11: INPUT DENSITY CORRECTION ADJUSTMENT INSTRUCTION
S12: FORM INTERNAL PATCH PATTERN
S13: DETECT PATCH DENSITY
S14: DETERMINE NEW OUTPUT CORRECTION VALUE
S15: REWRITE REFERENCE OUTPUT CORRECTION VALUE
S16: REWRITE CONVERSION VALUE
END

FIG. 3

← LOW DENSITY HIGH DENSITY →

| | | 4 | 8 | 12 | 16 | 32 | 64 | 96 | 128 | 160 | 192 | 224 | 240 | 244 | 248 | 252 |
|---|---|---|---|---|---|---|---|---|---|---|---|---|---|---|---|---|
| DITHER METHOD (MEDIUM LPI) | C | 6 | 11 | 19 | 23 | 39 | 67 | 100 | 118 | 155 | 175 | 223 | 215 | 222 | 233 | 239 |
| | M | 6 | 11 | 17 | 20 | 39 | 68 | 101 | 118 | 136 | 166 | 201 | 210 | 237 | 241 | 252 |
| | Y | 5 | 11 | 16 | 22 | 39 | 69 | 92 | 116 | 139 | 186 | 198 | 232 | 260 | 240 | 232 |
| | K | 5 | 10 | 16 | 23 | 41 | 75 | 91 | 118 | 155 | 165 | 200 | 230 | 233 | 249 | 240 |
| SIMPLE QUANTIZATION METHOD | C | 233% | 245% | 184% | 196% | 162% | 136% | 110% | 91% | 72% | 77% | 76% | 95% | 100% | 101% | 94% |
| | M | 267% | 209% | 182% | 195% | 187% | 143% | 112% | 86% | 85% | 75% | 84% | 108% | 97% | 102% | 103% |
| | Y | 340% | 245% | 206% | 177% | 177% | 145% | 112% | 93% | 83% | 73% | 84% | 87% | 82% | 86% | 108% |
| | K | 300% | 240% | 225% | 183% | 156% | 119% | 107% | 95% | 67% | 84% | 81% | 86% | 97% | 88% | 98% |
| ERROR DIFFUSION METHOD | C | −4 | −8 | −6 | −7 | −20 | −12 | −8 | 4 | 29 | 19 | 28 | 0 | −27 | −5 | 11 |
| | M | −3 | −8 | −9 | −11 | −17 | −10 | −5 | 8 | 19 | 7 | 3 | 6 | 22 | −3 | 7 |
| | Y | −6 | −7 | −11 | −10 | −12 | −19 | 1 | −1 | 3 | 26 | 11 | 30 | 41 | 2 | −7 |
| | K | −5 | −7 | −7 | −7 | −14 | −11 | −15 | −1 | 24 | 3 | 11 | −10 | −1 | 32 | −3 |
| DITHER METHOD (LOW LPI) | C | 1 | 1 | 4 | 2 | 0 | 0 | 9 | −12 | 6 | −22 | −15 | −39 | −32 | 7 | −29 |
| | M | 1 | 2 | 3 | 1 | 5 | −6 | −3 | −10 | −28 | −10 | −30 | −44 | −7 | 15 | −9 |
| | Y | 0 | 0 | 2 | 2 | 0 | −6 | −11 | 1 | −27 | 18 | −41 | −13 | 39 | 14 | −43 |
| | K | 0 | 0 | 0 | 2 | 7 | 12 | −6 | 5 | 7 | −29 | −6 | 8 | −7 | −19 | −27 |
| DITHER METHOD (HIGH LPI) | C | −1 | −3 | 0 | −4 | −8 | −11 | −2 | 7 | 23 | −6 | 3 | 3 | −4 | 13 | −7 |
| | M | 0 | −3 | −4 | −7 | −6 | −2 | −2 | −1 | −17 | 12 | 2 | 0 | 22 | 21 | −3 |
| | Y | −1 | −2 | −5 | −3 | −4 | −13 | −9 | 3 | 12 | 24 | −10 | −20 | 8 | −13 | −7 |
| | K | −2 | −3 | −4 | −3 | −5 | 5 | −16 | −2 | 15 | −9 | 7 | 19 | 11 | −8 | 12 |

FIG. 5

```
/* FIND CONVERSION VALUES FROM REFERENCE OUTPUT CORRECTION VALUE */
/* CALCULATION OF RATIO */
void caliculate_ratio_convert_table(
    int convert_table[CONVERTTABLE_SIZE],
    int base_table[CONVERTTABLE_SIZE],
    float conversion_ratio[CONVERTTABLE_SIZE])
{
    int i;

    for(i = 0; i < CONVERTTABLE_SIZE; i += 1) {
        convert_table[i] = base_table[i] * conversion_ratio[i];
    }
}

/* CALCULATION OF DIFFERENCE */
void caliculate_diff_convert_table(
    int convert_table[CONVERTTABLE_SIZE],
    int base_table[CONVERTTABLE_SIZE],
    int conversion_value[CONVERTTABLE_SIZE])
{
    int i;

    for(i = 0; i < CONVERTTABLE_SIZE; i += 1) {
        convert_table[i] = base_table[i] * conversion_value[i];
    }
}
```

IMAGE PROCESSING APPARATUS AND IMAGE FORMING APPARATUS WITH A TONER DENSITY CORRECTION FUNCTION

This Nonprovisional application claims priority under 35 U.S.C. §119(a) on Patent Application No. 2010-146314 filed in Japan on Jun. 28, 2010, the entire contents of which are hereby incorporated by reference.

TECHNICAL FIELD

The present invention relates to an image processing apparatus for carrying out a density correction with respect to an image forming apparatus. More specifically, the present invention relates to (i) an image processing apparatus which has a function of carrying out a plurality of halftone processes, carries out a density correction by actual measurement with respect to only one of the plurality of halftone processes that is required to be subjected to the density correction, and carries out the density correction with respect to the other halftone processes by conversion from a result of the density correction by actual measurement carried out with respect to the only one halftone process and (ii) an image forming apparatus including the image processing apparatus.

BACKGROUND ART

Conventionally, a display device which has a resolution of approximately 75 dpi (Dot Per Inch) to 100 dpi is commonly used for a personal computer (hereinafter, referred to as a PC). In contrast, as for a resolution of an image forming apparatus, an electrophotographic printer has a resolution of approximately 600 dpi to 2400 dpi, and an inkjet printer has a resolution of approximately 360 dpi to 2880 dpi. This shows that an image forming apparatus has a higher resolution than a PC display device.

As for gradation, a PC display device provides 256-level gray scale for each of RGB. In contrast, an image forming apparatus providing two-level gray scale is commonly used, and an image forming apparatus provides approximately 64-level gray scale at most. Even an image forming apparatus providing approximately 64-level gray scale often fails to appropriately express gradation in a low-density part and a high-density part of a printed image.

As described earlier, a PC display device which displays a digital image and an image forming apparatus which prints the digital image greatly differ mainly in resolution and gradation.

Therefore, in order to absorb a difference in gradation, an image forming apparatus carries out a halftone process (also referred to as a gradation reproduction process or quantization means) such as a dither method or an error diffusion method in printing a digital image. Such a halftone process has a characteristic of obtaining gradation in exchange for resolution or obtaining resolution in exchange for gradation. The image forming apparatus properly uses a plurality of halftone processes in accordance with a type of a digital image to be printed.

For example, in order to print a text, the image forming apparatus carries out a halftone process which places greater importance on reproduction of resolution than on reproduction of gradation. In contrast, in order to print a photograph, the image forming apparatus carries out a halftone process which places greater importance on reproduction of gradation than on reproduction of resolution. In this case, it is known that a shape (a curved line) of a density characteristic to be reproduced varies depending on a kind and/or a setting of a halftone process.

FIG. 10 is a graph illustrating density characteristics of respective halftone processes. The density characteristics of the respective halftone processes differ among the halftone processes. For example, a halftone process for providing a high resolution such as an error diffusion method or a high lpi (line per inch) dither method has a density characteristic which is close to a density characteristic of an image forming apparatus itself. In contrast, a halftone process for providing a low resolution such as a low lpi dither method tends to have a density characteristic which is close to a straight line (an ideal density characteristic). Note that a curved line which shows such a density characteristic of a halftone process changes over time depending on, for example, conditions such as temperature and humidity, and a usage state.

Therefore, an image forming apparatus having a function of carrying out a plurality of halftone processes carries out process control so as to keep a printing density and a color tone constant among the plurality of halftone processes. Then, the image forming apparatus carries out a density correction with respect to each of the plurality of halftone processes. The process control, which is an image quality adjustment for achieving both user convenience and a stable image quality, is carried out at turn-on, when a change over time or an environmental change is detected, or at a timing at which the number of sheets printed reaches a given number.

Patent Literature 1 discloses a density correction method. According to the density correction method, an arrangement having a function of carrying out plurality of halftone processes carries out a density correction by forming toner patches for all halftone processes that are required to be subjected to the density correction and actually measuring patch densities of the toner patches.

However, according to the density correction method of Patent Literature 1, actual patch density measurement is carried out with respect to each of the halftone processes that is required to be subjected to the density correction. Therefore, this causes problems of (i) costs for materials to be consumed (e.g., toner and ink) and (ii) longer time required for the density correction.

Patent Literature 2 proposes a density correction method such that one of a plurality of halftone processes is set as a reference halftone process, a density correction is carried out with respect to only the reference halftone process by actual patch density measurement, and the density correction is carried out with respect to the other halftone processes by conversion from an output correction value of the reference halftone process (a result of the density correction carried out with respect to the reference halftone process).

Patent Literature 2 can solve the problems of Patent Literature 1. This is because according to Patent Literature 2, an output correction value is found by carrying out actual patch density measurement with respect to only the reference halftone process, and merely conversion from the output correction value of the reference halftone process is carried out with respect to the other halftone processes.

Citation List

Patent Literature 1

Japanese Patent Application Publication, Tokukai, No. 2002-374416 A (Publication Date: Dec. 26, 2002)

Patent Literature 2

Japanese Patent Application Publication, Tokukai, No. 2005-144883 A (Publication Date: Jun. 9, 2005)

SUMMARY OF INVENTION

Technical Problem

However, the density correction method of Patent Literature 2 is designed such that a conversion value, which is fixed, cannot be reviewed in carrying out the density correction by conversion from the output correction value of the reference halftone process.

Therefore, for a halftone process in which a density correction is carried out by use of a conversion value, the density correction method of Patent Literature 2 fails to respond to a case where a change over time in density characteristic of the halftone process occurs or an abnormality in the halftone process is indicated.

It is desirable that a conversion value be set for each device in view of an individual difference between devices. However, a common conversion value set in accordance with actual measurement may be set for devices of an identical model in terms of cost. In a case where a density correction is carried out by use of a fixed common conversion value, the density correction method of Patent Literature 2 also fails to respond to such an individual difference between devices.

The present invention has been made in view of the problems, and an object of the present invention is to make (i) an image processing apparatus in which a review of a conversion value and a conversion expression can be carried out with respect to the other halftone processes which are subjected to a density correction by conversion in accordance with an output correction value of a reference halftone process which has been subjected to the density correction, so that the density correction is carried out with high accuracy even by use of conversion, and (ii) an image forming apparatus including the image processing apparatus.

Solution to Problem

In order to attain the object of the present invention, an image forming apparatus having a function of carrying out a plurality of halftone processes, the image forming apparatus includes: a density correction process section for carrying out a density correction process with respect to the plurality of halftone processes; and a density correction adjustment section for adjusting the density correction process carried out by the density correction process section, the density correction process section finding an output correction value of a reference halftone process of the plurality of halftone processes by use of a result of measurement of densities of respective patches of a patch pattern subjected to the reference halftone process, and finding an output correction value of at least one of the plurality of halftone processes which is other than the reference halftone process by conversion from the output correction value of the reference halftone process by use of a conversion parameter set for the at least one halftone process, the density correction adjustment section receiving an instruction to adjust the density correction process carried out by the density correction process section and reviewing the conversion parameter used by the density correction process section, so as to adjust the density correction process.

According to the arrangement, the density correction adjustment section receives an instruction to adjust the density correction process carried out by the density correction process section and reviews the conversion parameter used by the density correction process section, so as to adjust the density correction process.

According to this, also for a halftone process using a conversion parameter, the conversion parameter can be reviewed properly in accordance with a change over time in density characteristic of the halftone process and/or an individual difference between apparatuses. This enables enhancement of a density correction accuracy.

Therefore, it is possible to make an image processing apparatus which carries out a density correction process with higher accuracy even by use of conversion as compared with a conventional arrangement in which a density correction process is carried out by use of a conversion parameter (a conversion value or a conversion expression) which cannot be rewritten and is fixed.

Advantageous Effects of Invention

As described earlier, the image processing apparatus in accordance with the present invention includes the density correction adjustment section receiving an instruction to adjust the density correction process carried out by the density correction process section and reviewing the conversion parameter used by the density correction process section, so as to adjust the density correction process.

Therefore, the present invention yields an effect of making an image processing apparatus which carries out a density correction process with higher accuracy even by use of conversion as compared with a conventional arrangement in which a density correction process is carried out by use of a conversion parameter (a conversion value or a conversion expression) which cannot be rewritten and is fixed.

BRIEF DESCRIPTION OF DRAWINGS

FIG. 3 illustrates an example of a conversion value table stored in a conversion value table storage section illustrated in FIG. 1.

FIG. 5 illustrates an example of a program for calculating a conversion value to be stored in the conversion value table illustrated in FIG. 3.

DESCRIPTION OF EMBODIMENTS

First Embodiment

A first embodiment of the present invention is described below with reference to FIGS. 1 through 7. The present embodiment discusses an application of an image processing apparatus in accordance with the present invention to an image forming apparatus.

Figure 2:
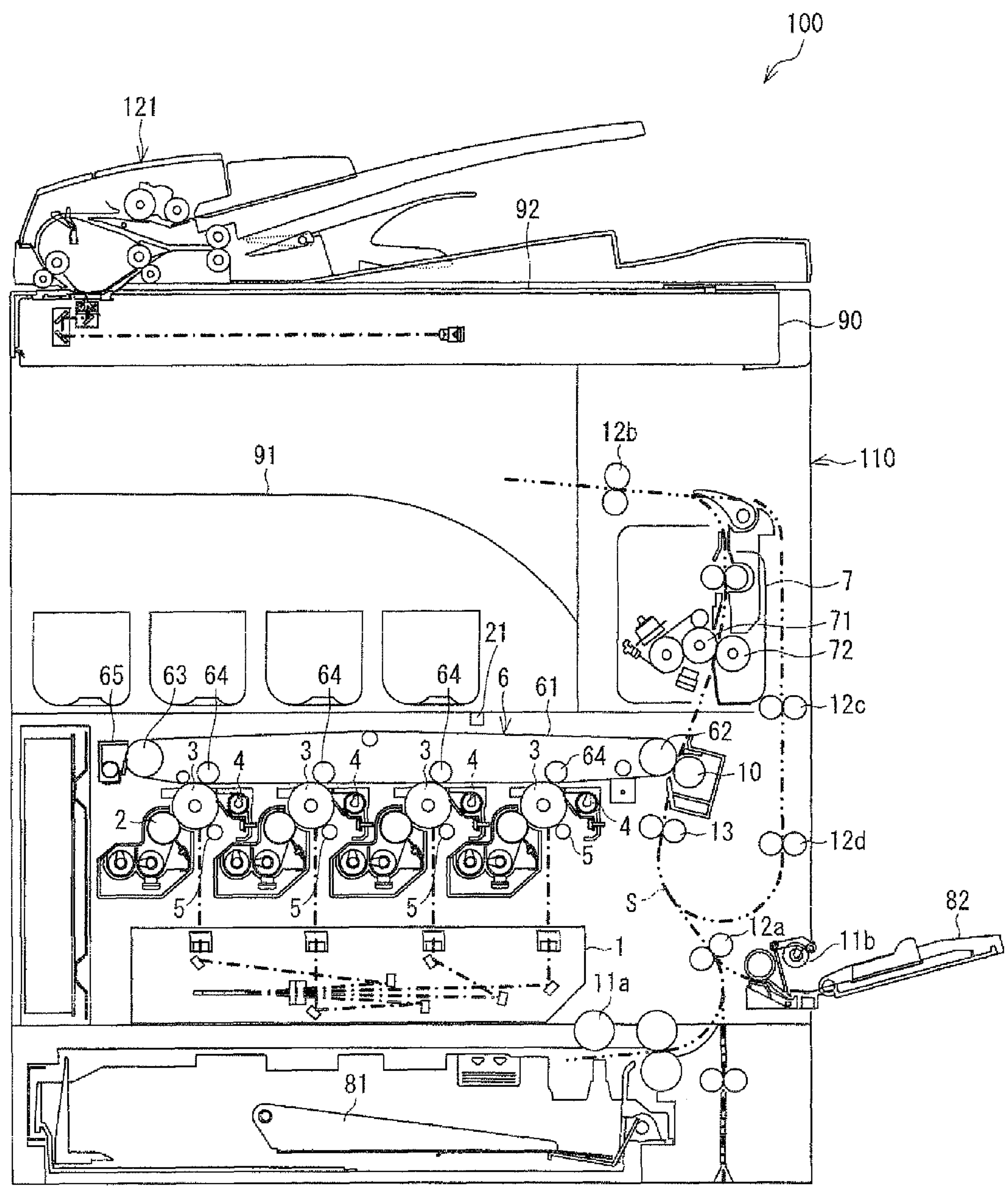
FIG. 2 is a cross-sectional view illustrating an example of an arrangement of an image forming apparatus including the image processing section illustrated in FIG. 1.
Figure 4:
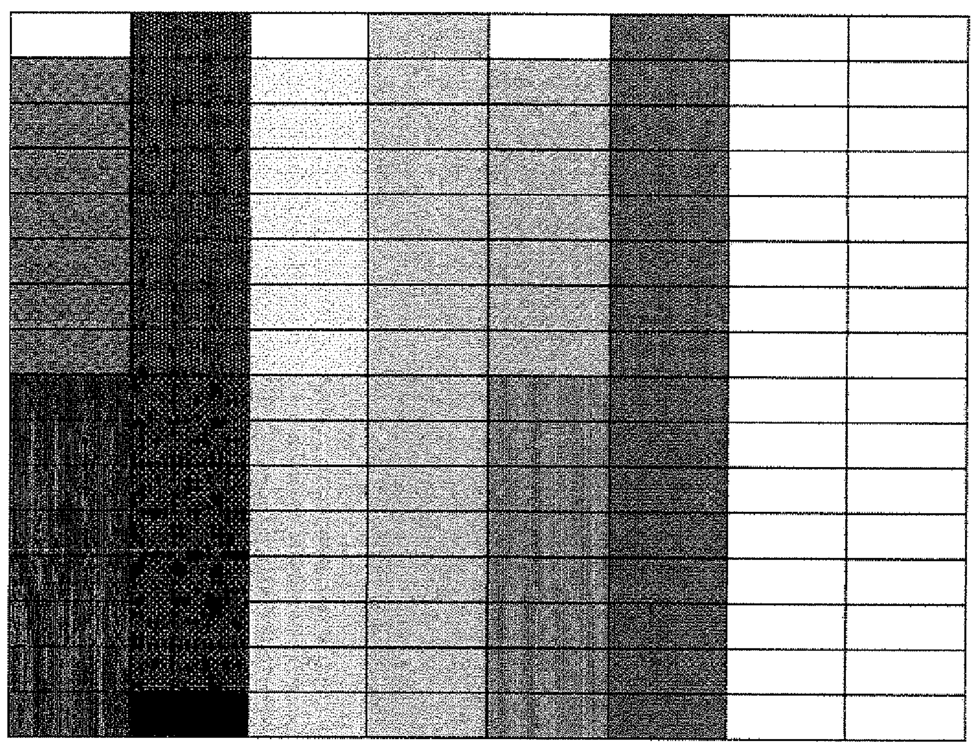
FIG. 4 illustrates an example of a patch set.

FIG. 2 is a cross-sectional view illustrating an example of an arrangement of an image forming apparatus 100 including an image processing section 20 in accordance with the present invention. In accordance with image data read by the image forming apparatus 100 or received from outside, the image forming apparatus 100 forms a multicolor or single color image on a given recording sheet which is a recording material.

The image forming apparatus 100 includes an apparatus body 110 and an automatically document processing device 121 (see FIG. 2).

The apparatus body 110 mainly includes an exposure unit 1, developing units 2, photoreceptor drums 3, cleaner units 4, chargers 5, an intermediate transfer belt unit 6, a fixing unit 7, a paper feeding cassette 81, a document reading device 90, and a paper output tray 91. The apparatus body 110 further includes the image processing section (image processing apparatus) 20 (see FIG. 1).

A platen 92 which is made of transparent glass and on which a document is placed is provided in an upper part of the apparatus body 110, and the automatically document processing device 121 is provided above the platen 92.

The automatically document processing device 121 automatically carries a document placed thereon to a reading position located in a vicinity of the platen 92. The automatically document processing device 121, which is rotatable about an axis which is parallel to a horizontal direction of FIG. 2, is arranged to uncover the platen 92, so that a document can be manually placed on the platen 92.

The document reading device 90 reads a document placed on the platen 92 or a document automatically carried to the reading position in the vicinity of the platen 92. Then, an image forming section 42 (see FIG. 1) receives image data indicative of an image of the read document.

Image data handled by the image forming apparatus 100 correspond to color images of black (K), cyan (C), magenta (M), and yellow (Y). Accordingly, the number of each of (i) the developing units 2, (ii) the photoreceptor drums 3, (iii) the chargers 5, and (iv) the cleaner units 4 is set to four so that four kinds of latent images corresponding to the respective colors are formed. A set of a developing unit 2, a photoreceptor drum 3, a charger 5, and a cleaner unit 4 is provided for a corresponding one of black, cyan, magenta, and yellow, so that four image forming stations are provided.

The chargers 5 are charging devices for uniformly charging top surfaces of the respective photoreceptor drums 3 at a given electric potential. Not only a charger illustrated in FIG. 2 but also a contact roller type charger or a brush type charger is usable as each of the chargers 5.

The exposure unit 1, which corresponds to an image writing device, is arranged as a laser scanning unit (LSU) mainly including a laser emitting section and a reflection mirror. A polygon mirror for scanning a laser beam and optical elements such as a lens and a mirror for guiding, to the photoreceptor drums 3, laser light reflected by the polygon mirror are provided in the exposure unit 1. Alternatively, for example, an arrangement using an EL or LED write head in which light emitting devices are arranged in an array pattern can be employed as the exposure unit 1.

The exposure unit 1 has a function of subjecting the photoreceptor drums 3 thus charged to exposure in accordance with image data received, so as to form static latent images on the top surfaces of the respective photoreceptor drums 3 in accordance with the image data.

The developing units 2 make the static latent images formed on the respective photoreceptor drums 3 visible as toner images by use of toners of four colors (YMCK).

The cleaner units 4 remove and collect the toners remaining on the top surfaces of the respective photoreceptor drums 3 after development and image transfer.

The intermediate transfer belt unit 6 provided above the photoreceptor drums 3 includes an intermediate transfer belt 61, an intermediate transfer belt driving roller 62, an intermediate transfer belt driven roller 63, intermediate transfer rollers 64, and an intermediate transfer belt cleaning unit 65. The number of the intermediate transfer rollers 64 is set to four so that the intermediate transfer rollers 64 correspond to the respective colors of YMCK.

The intermediate transfer belt driving roller 62, the intermediate transfer belt driven roller 63, and the intermediate transfer rollers 64 stretch the intermediate transfer belt 61 so as to rotatably drive the intermediate transfer belt 61. The intermediate transfer rollers 64 apply transfer biases, so as to transfer the toner images on the respective photoreceptor drums 3 onto the intermediate transfer belt 61.

The intermediate transfer belt 61 is provided so as to be in contact with the photoreceptor drums 3. The intermediate transfer belt unit 6 forms a color toner image (multicolor toner image) thereon by sequentially superimposing the toner images of the respective colors formed on the respective photoreceptor drums 3 on the intermediate transfer belt 61 so as to transfer the toner images. The intermediate transfer belt 61 is made of, for example, a film having a thickness of approximately 100 μm to 150 μm so as to have no end.

The intermediate transfer rollers 64 which are in contact with a backside of the intermediate transfer belt 61 transfer the toner images of the respective colors from the photoreceptor drums 3 onto the intermediate transfer belt 61. High-voltage transfer biases (high voltages of polarity (+) reverse to charging polarity (−) of toner) are applied to the respective intermediate transfer rollers 64 so that the toner images are transferred onto the intermediate transfer belt 61.

Each of the intermediate transfer rollers 64 is a roller whose base is a metal (e.g., stainless) shaft having a diameter of 8 mm to 10 mm and whose top surface is covered with an electroconductive elastic material (e.g., EPDM or urethane foam). Such an electroconductive elastic material enables uniform application of a high voltage to the intermediate transfer belt 61. The present embodiment uses a roller type transfer electrode. Alternatively, a brush type transfer electrode or the like is also usable.

As described earlier, the toner images made visible on the respective photoreceptor drums 3 in accordance with the respective colors are stacked on the intermediate transfer belt 61. Rotation of the intermediate transfer belt 61 causes information on the images thus stacked to be transferred onto a recording sheet by a transfer roller 10 (described later) provided in a part in which the recording sheet and the intermediate transfer belt 61 are in contact with each other.

In this case, the intermediate transfer belt 61 and the transfer roller 10 are pressure-joined with a given nip, and a voltage (a high voltage of polarity (+) reverse to charging polarity (−) of toner) is applied to the transfer roller 10 so that the toner images are transferred onto the recording sheet. Of the transfer roller 10 and the intermediate transfer belt driving roller 62, one is made of a rigid material (e.g., metal) and the other is made of a flexible material (e.g., rubber or plastic foam), so that the given nip is obtained steadily.

Toners which have been attached to the intermediate transfer belt 61 due to their contact with the photoreceptor drums 3 and remain on the intermediate transfer belt 61 without being transferred onto the recording sheet by the transfer roller 10 may cause a color mixture of the toners in a subsequent step. Therefore, the intermediate transfer belt cleaning unit 65 removes and collects the toners remaining on the intermediate transfer belt 61.

The intermediate transfer belt cleaning unit 65 includes a cleaning member such as a cleaning blade which is in contact with the intermediate transfer belt 61. The driven roller 63 supports, from a backside of the intermediate transfer belt 61, a part of the intermediate transfer belt 61 which part is in contact with the cleaning blade.

A sensor (a detection section) 21 is provided to face a surface of the intermediate transfer belt 61 on which surface toner patches (described later) are formed. The sensor 21 is a reflective sensor for detecting densities of the respective toner patches formed on the intermediate transfer belt 61.

The paper feeding cassette 81, which is a tray in which recording sheets to be used for image formation are accumulated, is provided under the exposure unit 1 of the apparatus body 110. Recording sheets to be used for image formation can also be placed in a manual paper feeding cassette 82. The paper output tray 91 provided above the apparatus body 110 is a tray in which printed recording sheets are accumulated facedown.

The apparatus body 110 has a recording sheet carrying path S which is substantially vertical and through which the recording sheets in the paper feeding cassette 81 and the manual paper feeding cassette 82 are sent to the paper output tray 91 via the transfer roller 10 and the fixing unit 7. Pickup rollers 11*a* and 11*b*, a plurality of carrying rollers 12*a* through 12*d*, a registration roller 13, the transfer roller 10, the fixing unit 7, etc. are provided in a vicinity of the recording sheet carrying path S from the paper feeding cassette 81 or the manual paper feeding cassette 82 to the paper output tray 91.

The plurality of carrying rollers 12*a* through 12*d* are small rollers which are provided along the recording sheet carrying path S so as to accelerate and assist carriage of recording sheets. The pickup roller 11*a*, which is provided in a vicinity of an end of the paper feeding cassette 81, picks up the recording sheets one by one from the paper feeding cassette 81, so as to supply the recording sheets thus picked up to the recording sheet carrying path S. Similarly, the pickup roller 11*b*, which is provided in a vicinity of an end of the manual paper feeding cassette 82, picks up the recording sheets one by one from the manual paper feeding cassette 82, so as to supply the recording sheets thus picked up to the recording sheet carrying path S.

The registration roller 13 temporarily holds a recording sheet which is being carried through the recording sheet carrying path S. The registration roller 13 carries the recording sheet to the transfer roller 10 at a timing at which an end of a toner image transferred onto the intermediate transfer belt 61 and a given part of the recording sheet are positionally adjusted.

The fixing unit 7 includes a fixing roller 71 and a pressure roller 72. The fixing roller 71 and the pressure roller 72 rotate with a recording sheet sandwiched therebetween. The image forming section 42 sets a temperature of the fixing roller 71 to not less than a given fixing temperature in accordance with a signal from a thermistor. The fixing roller 71 and the pressure roller 72 bond by thermocompression unfixed toner with the recording sheet, so as to melt, mix, and pressure-join the multicolor toner image transferred onto the recording sheet and then heat fix the resulting image to the recording sheet. A heater lump for heating the fixing roller 71 is provided in the fixing roller 71. Note that the fixing temperature (given temperature) refers to a temperature at which a fixing process can be carried out favorably.

The following description specifically discusses a recording sheet carrying path. As described earlier, the paper feeding cassette 81 and the manual paper feeding cassette 82 for storing recording sheets are preliminarily provided in the image forming apparatus 100. The pickup rollers 11*a* and 11*b* are provided for the paper feeding cassettes 81 and 82, respectively so that the recording sheets are fed from the paper feeding cassettes 81 and 82. The pickup rollers 11*a* and 11*b* guide the recording sheets one by one to the recording sheet carrying path S.

Each of the recording sheets is carried from the paper feeding cassette 81 or 82 to the registration roller 13 by the carrying roller 12*a* provided in the recording sheet carrying path S. The recording sheet is carried to the transfer roller 10 at a timing at which a given part of the recording sheet and an end of image information on the intermediate transfer belt 61 is positionally adjusted, so that the image information is written onto the recording sheet (namely, the toner image is transferred onto the recording sheet). Thereafter, the recording sheet passes through the fixing unit 7, so that unfixed toner on the recording sheet is molten by heat to be fixed to the recording sheet. Then, the recording sheet is discharged to the paper output tray 91 via the carrying roller 12*b*.

The carrying path described earlier applies to a case where a request is made for carrying out single-side printing with respect to a recording sheet. In contrast, assume that a request is made for carrying out double-side printing with respect to the recording sheet. When the carrying roller 12*b*, which is the last carrying roller, holds a rear end of the recording sheet which has passed through the fixing unit 7 and has been subjected to single-side printing, the carrying roller 12*b* reversely rotates, so as to guide the recording sheet to the carrying roller 12*c* and the carrying roller 12*d*.

Note that a display section (not illustrated) for indicating information to a user and an instruction input section 41 (see FIG. 1) for receiving an instruction from the user to the image forming apparatus 100 are provided in the upper part of the apparatus body 110.

Note here that the image forming apparatus 100 in accordance with the present embodiment has a plurality of printing modes and properly uses a plurality of halftone processes in accordance with the respective plurality of printing modes so that gradation can be expressed favorably in accordance with the plurality of printing modes.

Therefore, the image processing section 20 of the image forming apparatus 100 carries out a density correction with respect to the plurality of halftone processes so that density characteristics such as a printing density and a color tone are kept constant between the plurality of halftone processes.

Figure 1:
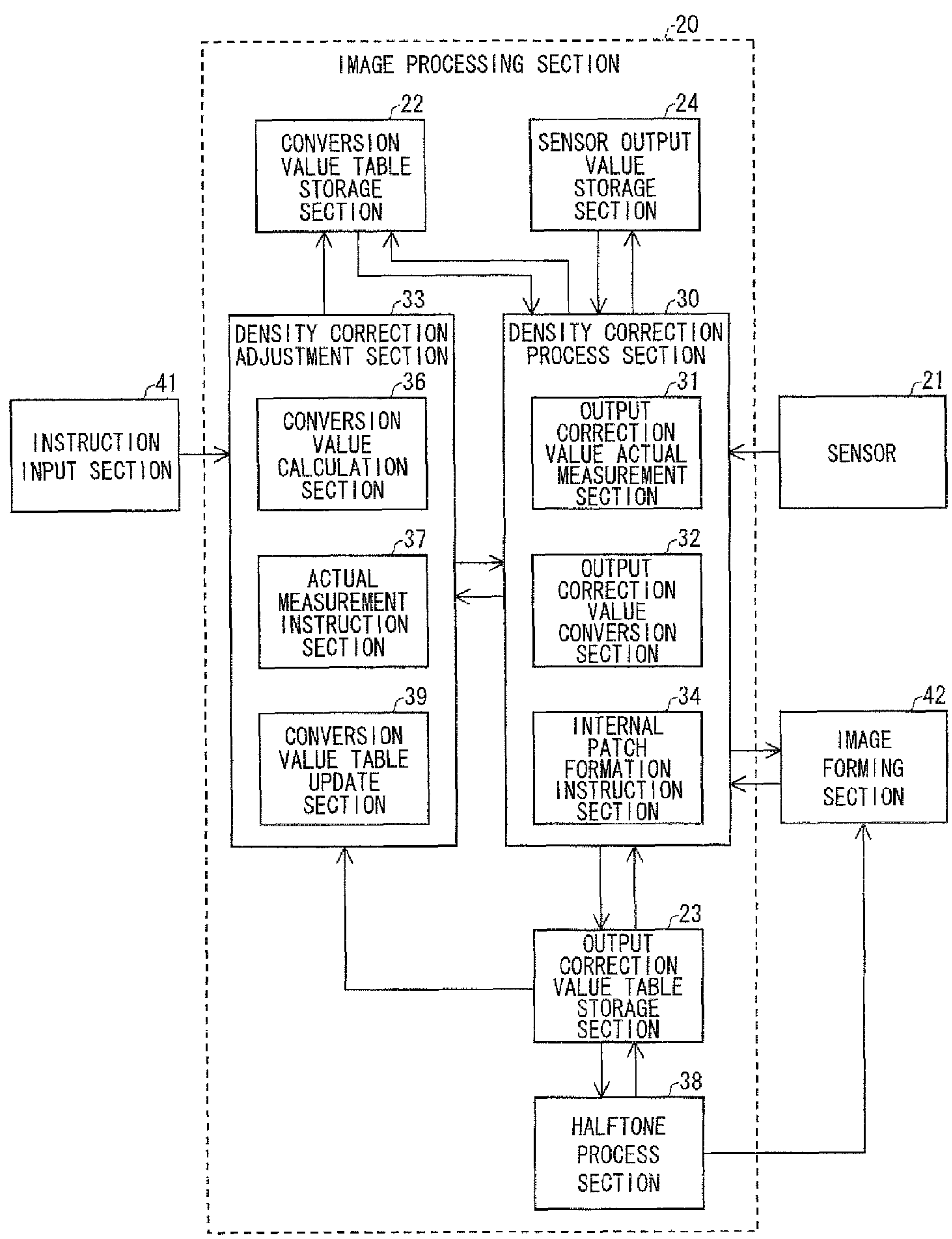
FIG. 1 is a block diagram illustrating an example of an arrangement of an image processing section in accordance with an embodiment of the present invention.

FIG. 1 is a functional block diagram illustrating an arrangement of the image processing section 20 of the image forming apparatus 100 in accordance with the present embodiment. The image processing section 20 includes a halftone process section 38, a density correction process section 30, a density correction adjustment section 33, a conversion value table storage section 22, an output correction value table storage section 23, and a sensor output value storage section 24. Note that the image processing section 20 is constituted mainly by a CPU (Central Processing Unit), a ROM (Read Only Memory), and a RAM (Random Access Memory).

The halftone process section 38 carries out a halftone process in accordance with a function and a mode with respect to image data. For example, the halftone process section 38 carries out the following five halftone processes A through E in accordance with a combination of a function and a mode.

Halftone process A: dither method•medium·lpi (copy function—for text and photograph mixture mode)

Halftone process B: simple quantization method (copy function—all modes for text region)

Halftone process C: error diffusion method (copy function—for text document mode)

Halftone process D: dither method•low lpi (copy function—for photograph mode)

Halftone process E: dither method•high lpi (for printer function)

In the process control carried out at turn-on or when a change over time or an environmental change is detected, the density correction process section 30 carries out a density correction with respect to the plurality of halftone processes carried out by the halftone process section 38.

The density correction process section 30 finds an output correction value of a reference halftone process in accordance with a result of actual measurement of densities of respective toner patches formed on the intermediate transfer belt 61, the reference halftone process serving as one reference halftone process of the plurality of halftone processes carried out in the image forming apparatus 100. The following description may refer to the output correction value of the reference halftone process found by actual measurement as a reference output correction value.

The density correction process section 30 finds output correction values of halftone processes other than the reference halftone process (hereinafter referred to as the other halftone processes) in accordance with the reference output correction value by conversion by use of a conversion value table (see FIG. 3). The following description may refer to the output correction values of the other halftone processes found by conversion from the reference output correction value as conversion output correction values as opposed to the reference output correction value.

According to the present embodiment, the density correction process section 30 finds an output correction value (a reference output correction value) by actually measuring a patch density assuming that the halftone process A, i.e., dither method •medium lpi is the reference halftone process, and the density correction process section 30 finds output correction values (conversion output correction values) of the halftone processes B through E by conversion.

An output correction value table provided in the output correction value table storage section 23 stores the output correction values found by the density correction process section 30. The output correction table stores the output correction values with respect to a given density value for each of the halftone processes. The halftone process section 38 reads out, from the output correction table, an output correction value corresponding to a halftone process to be carried out, so as to carry out the halftone process.

The conversion value table storage section 22 stores the conversion value table. The conversion value table stores conversion values with respect to a given density value so that the conversion values correspond to the respective halftone processes whose output correction values are found by use of conversion values (specifically described later). The conversion value table storage section 22 is constituted by, for example, a nonvolatile memory so that data is held even after the image forming apparatus 100 turns off.

The sensor output value storage section 24 stores sensor outputs which the density correction process section 30 uses to carry out a density correction in accordance with actual measurement and which serve as a reference for an output adjustment. How to find the sensor outputs serving as the reference for the output adjustment is to be described later. The sensor output value storage section 24 stores values (the sensor outputs) which are obtained when the sensor 21 (described later) reads patch densities as much as 15 points indicative of a density characteristic of the image forming section 42 for each of cyan, magenta, yellow, and black. The sensor output value storage section 24 is also constituted by a nonvolatile memory since data needs to be held even after the image forming apparatus 100 turns off.

The density correction adjustment section 33 receives, from the instruction input section 41, an instruction to adjust a density correction process. Then, the density correction adjustment section 33 reviews the conversion value table which stores the conversion values (conversion parameters) to be used by the density correction process section 30 for calculation of output correction values, so as to adjust the density correction process.

The following description more specifically discusses the density correction process section 30 and the density correction adjustment section 33.

First, the density correction process section 30 is to be described. The density correction process section includes an output correction value actual measurement section 31, an output correction value conversion section 32, and an internal patch formation instruction section 34.

In the process control, in response to an instruction from the output correction value actual measurement section 31, the internal patch formation instruction section 34 generates a command to form an internal patch pattern subjected to the reference halftone process, so as to give the command to the image forming section 42.

According to the present embodiment, in order to adjust the density correction process, the internal patch formation instruction section 34 generates a command to form an internal patch pattern subjected to a halftone process carried out as instructed from the density correction adjustment section 33, so as to give the command to the image forming section 42.

The image forming section 42 which has obtained the command mainly controls the image forming stations (described earlier) to form the internal patch pattern on the intermediate transfer belt 61. Note here that a patch which is merely formed on the intermediate transfer belt 61 but is not printed out is referred to as an internal patch.

In the process control, the output correction value actual measurement section 31 carries out a density correction with respect to the reference halftone process by actual patch density measurement, so as to update the output correction value of the reference halftone process which is stored in the output correction value table.

More specifically, the output correction value actual measurement section 31 instructs the internal patch formation instruction section 34 to form an internal patch pattern subjected to the reference halftone process. The sensor 21 reads a patch density of the internal patch pattern formed on the intermediate transfer belt 61. From sensor outputs of the sensor 21 which has read the patch density of the internal patch pattern thus formed, the output correction value actual measurement section 31 determines a patch which is identical in value to a sensor output stored in the sensor output storage section 24 and serving as the reference for the output adjustment, so as to set, to an output correction value, an output value used to form the determined patch. The output correction value table stores the output correction value as the output correction value of the reference halftone process, that is, the reference output correction value.

According to the present embodiment, in a case where the density correction adjustment section 33 instructs the output correction value actual measurement section 31 to adjust the density correction process, the output correction value actual measurement section 31 carries out the density correction, by actual patch density measurement, with respect to a halftone process whose adjustment has been instructed from the density correction adjustment section 33, so as to calculate, by actual measurement, an output correction value of the halftone process whose adjustment has been instructed.

More specifically, the output correction value actual measurement section 31 instructs the internal patch formation instruction section 34 to form an internal patch pattern subjected to the halftone process whose adjustment has been instructed from the density correction adjustment section 33. The sensor 21 reads a patch density of the internal patch pattern formed on the intermediate transfer belt 61. From sensor outputs of the sensor 21 which has read the patch density of the internal patch pattern thus formed, the output correction value actual measurement section 31 determines a patch which is identical in value to a sensor output stored in the sensor output storage section 24 and serving as the reference for the output adjustment, so as to set, to an output correction value, an output value used to form the determined patch. A conversion value calculation section (a first conversion parameter calculation section or a second conversion parameter calculation section) 36 (described later) uses the output correction value to calculate a conversion value.

The sensor 21 detects densities of respective patches of an internal patch pattern formed on the intermediate transfer belt 61 (see FIG. 2). According to the present embodiment, the sensor 21 detects, as a toner density, a reflectance of toner from which each patch is made, so as to supply, to the image processing section 20, a sensor output in accordance with the reflectance.

The output correction value conversion section 32 calculates conversion output correction values which are output correction values of the halftone processes other than the reference halftone process by use of (i) the reference output correction value set by the output correction value actual measurement section 31 and (ii) the conversion values stored in the conversion value table. The output correction values of the other halftone processes thus calculated and the reference output correction value are stored together in the output correction value table. Note that the output correction value conversion section 32 can be arranged such that, when a halftone process to be used is determined, the output correction value conversion section 32 calculates a conversion output correction value in accordance with the determined halftone process, so as to cause the output correction value table to store the calculated conversion output correction value.

The following description discusses the density correction adjustment section 33. The density correction adjustment section 33 includes an actual measurement instruction section 37, a conversion value calculation section 36, and a conversion value table update section 39.

In response to an instruction from the instruction input section 41 to adjust the density correction process carried out by the density correction process section 30, the actual measurement instruction section 37 instructs the output correction value actual measurement section 31 of the density correction process section 30 to find, by actual measurement, an output correction value of the halftone process whose adjustment has been instructed.

Specifically, in response to the instruction to adjust the density correction process carried out by the density correction process section 30, the actual measurement instruction section 37 instructs the output correction value actual measurement section 31 to carry out a density correction, by actual patch density measurement, with respect to the halftone process whose adjustment has been instructed, so as to find an output correction value by actual measurement. Namely, the actual measurement instruction section 37 and the output correction value actual measurement section 31 constitute the first output correction value actual measurement section and the second output correction value actual measurement section of the present invention.

In a case where the halftone process whose adjustment has been instructed belongs to the halftone processes other than the reference halftone process, the conversion value calculation section 36 calculates a new conversion parameter for the halftone process in accordance with (i) the output correction value of the halftone process found by the output correction value actual measurement section 31 by actual measurement and (ii) the reference output correction value stored in the output correction value table (functions as the first conversion parameter calculation section). Note here that the reference output correction value stored in the output correction value table has been updated in the process control carried out by the density correction process section 30.

After the conversion value calculation section 36 has calculated a new conversion value, the conversion value table update section 39 accesses the conversion value table storage section 22, so as to update the conversion value set for the halftone process whose adjustment has been instructed to the conversion value which has been newly calculated by the conversion value calculation section 36 (functions as the first conversion parameter update section).

The output correction value, stored in the output correction value table, of the halftone process whose adjustment has been instructed is also rewritten to the output correction value found by the output correction value actual measurement section 31 so that the conversion value is reviewed.

In a case where the halftone process whose adjustment has been instructed is the reference halftone process, for all the halftone processes having conversion values, the conversion value calculation section 36 calculates new conversion values in accordance with (i) an output correction value (a new reference output correction value) of the reference halftone process found by the output correction value actual measurement section 31 by actual measurement but not in the process control, (ii) the reference output correction value stored in the output correction value table, and (iii) the conversion value stored in the conversion value table (functions as the second conversion parameter calculation section).

Note here that the conversion value calculation section 36 calculates the new conversion values so that an output correction value found by conversion from the output correction value of the reference halftone process found by the output correction value actual measurement section 31 by actual measurement in response to the adjustment instruction but not in the process control is identical in value to an output correction value found by conversion from the output correction value of the reference halftone process stored in the output correction value table.

After the conversion value calculation section 36 has calculated the new conversion values for all the halftone processes having conversion values, the conversion value table update section 39 accesses the conversion value table storage section 22, so as to update the conversion values set for all the halftone processes having conversion values to the conversion values which have been newly calculated by the conversion value calculation section 36 (functions as the second conversion parameter update section).

As described earlier, in a case where an output correction value of the reference halftone process is newly found in the density correction adjustment but not in the process control, the reference output correction value stored in the output correction value table is also updated.

Namely, in response to the instruction to adjust the reference halftone process, the density correction adjustment section 33 newly finds a reference output correction value so as to update the reference output correction value stored in the output correction value table, and recalculates the conversion values of all the halftone processes stored in the conversion value table so that conversion values of the other halftone processes which have been obtained by conversion from the new output correction value of the reference halftone process are identical to output correction values obtained by conversion from the reference output correction value which is old and has not been updated.

The following description specifically discusses processes carried out in the image processing section 20 and including the density correction adjustment process carried out by the density correction adjustment section 33.

First, how to prepare a conversion value table is to be described. Note that it is desirable to set a conversion value table for each image forming apparatus so that an individual difference between apparatuses can be absorbed. However, a common conversion value table prepared in accordance with actual measurement is commonly preliminarily set for image forming apparatuses of an identical model.

FIG. 3 illustrates an example of the conversion value table. In the example of FIG. 3, the reference output correction value which is the output correction value of the reference halftone process (hereinafter referred to as a reference halftone process A) and serves as a reference for calculation of a conversion value is stored in a first tier of the conversion value table. Conversion values of the other halftone processes (hereinafter referred to as the other halftone processes B through E) are stored in second through fifth tiers of the conversion value table.

In order to make it easy to understand how output correction values are calculated by use of conversion values, FIG. 3 shows the example as if the reference output correction value was also stored in the conversion value table. However, what is described in the first tier shows the reference output correction value stored in the output correction value table.

Note that it is not necessarily required that a conversion value table preparation section (not illustrated) be provided in the image processing section 20. Alternatively, a conversion value table commonly set for image forming apparatuses of an identical model can be initially set for the conversion value table storage section 22.

The conversion value table preparation section causes the image forming section 42 to print a patch set (see FIG. 4) on a recording sheet in a state where no output adjustment is carried out. The patch set forms a plurality of patches for each of cyan, magenta, yellow, and black. According to the present embodiment, since a density value indicative of the density characteristic of the image forming section 42 is set to 15 points, 32 patches which are sufficiently more than 15 points are formed for each of the colors. Note here that data on the patch set can be preliminarily stored in the image forming apparatus 100 or can be received from an external PC. The document reading device 90 (see FIG. 2) reads the recording sheet thus printed.

From a result of reading by the document reading device 90 of the patch set which has been printed on the recording sheet, the conversion value table preparation section selects, for each of the colors, 15 patches which correspond to the density value of 15 points that are suitable for defining a curved line and indicative of the density characteristic of the image forming section 42. Then, the conversion value table preparation section causes the selected 15 patches to be formed on the intermediate transfer belt 61, so as to cause the sensor to read reflectances (densities) of the respective patches. The sensor output value storage section 24 stores the reflectances of the respective patches read here as sensor output values serving as the reference for the output adjustment. The sensor output values which are stored in the sensor output value storage section 24 and correspond to the reflectances of the respective patches thus serve as a reference for a density correction to be carried out in a subsequent process control.

Next, the conversion value table preparation section instructs the internal patch formation instruction section 34 to form an internal patch pattern subjected to the reference halftone process A. From sensor outputs of the sensor 21 which has read a patch density of the internal patch pattern formed on the intermediate transfer belt 61, the conversion value table preparation section determines a patch which is identical in value to a sensor output value stored in the sensor output storage section 24 and serving as the reference for the output adjustment, so as to set, to a reference output correction value, an output value used to form the determined patch. The output correction value table stores the reference output correction value.

For example, in a case where a density of a patch formed by the reference halftone process A when an input value is "118" is identical to a density of a patch formed when an input value stored in the sensor output value storage section 24 is "128", a registered output correction value of the reference halftone process A is set to "118" with respect to the input value of "128".

Similarly, the conversion value table preparation section causes the internal patch formation instruction section 34 to form internal patch patterns subjected to the other halftone processes B through E, so as to find, also by actual measurement, output correction values of the other halftone processes B through E. In this case, differently from the case of the reference halftone process A, the output correction values of the other halftone processes B through E found by actual measurement are not stored as they are but are stored in the form of conversion values with respect to the reference output correction value of the reference halftone process A.

In the example of the conversion value table of FIG. 3, a ratio to the reference output correction value is stored as a conversion value for the halftone process B. Differences from the reference output correction value are stored as conversion values for the halftone processes C through E. Equations (1) and (2) by which a conversion value is calculated are described below.

When a conversion value is a ratio:

conversion value (ratio)=output correction value of other halftone process found by actual measurement/reference output correction value of reference halftone process (1)

When a conversion value is a difference:

conversion value (difference)=output correction value of other halftone process found by actual measurement−reference output correction value of reference halftone process (2)

FIG. 5 illustrates an example of a program for calculating a conversion value to be stored in the conversion value table. For example, a program as illustrated in FIG. 5 enables calculation of a conversion value.

The conversion value table in which the conversion values of the other halftone processes B through E are stored are thus prepared so that conversion output correction values are calculated by use of the reference output correction value of the reference halftone process A.

The following description discusses the density correction process carried out in the process control at turn-on or when a change over time or an environmental charge is detected.

in the process control, in response to the instruction from the output correction value actual measurement section 31, the internal patch formation instruction section 34 generates a command to form the internal patch pattern subjected to the reference halftone process A, so as to give the command to the image forming section 42. The image forming section 42 which has obtained the command mainly controls the image forming stations (described earlier) to form the internal patch pattern on the intermediate transfer belt 61.

The sensor 21 reads a patch density of the internal patch pattern thus formed. From sensor outputs of the sensor 21 which has read the patch density of the internal patch pattern thus formed, the output correction value actual measurement section 31 determines a patch which is identical in value to a sensor output value stored in the sensor output storage section 24 and serving as the reference for the output adjustment. Then, the output correction value actual measurement section 31 sets, to an output correction value, an output value used to form the determined patch, so as to update the reference output correction value of the reference halftone process stored in the output correction value table.

In response to the update to the reference output correction value stored in the output correction value table, the output correction value conversion section 32 calculates conversion output correction values of the other halftone processes B through E by use of the updated reference output correction value and the conversion values stored in the conversion value table, so as to update the output correction values of the other halftone processes B through E stored in the output correction value table. Equations (3) and (4) by which a conversion output correction value is calculated are described below.

When a conversion value is a ratio:

conversion output correction value=updated reference output correction value×conversion value stored in conversion value table (3)

When a conversion value is a difference:

conversion output correction value=updated reference output correction value+conversion value stored in conversion value table (4)

As described earlier, the density correction process section 30 forms an internal patch pattern for only the reference halftone process A, so as to calculate an output correction value by actual patch density measurement. The density correction process section 30 calculates, by conversion, conversion correction values for the other halftone processes B through E without forming internal patch patterns. This enables a reduction in printing material and processing time.

The following description discusses the density correction adjustment process in which the density correction process is adjusted by reviewing the conversion values stored in the conversion value table. As described earlier, in the common density correction process carried out in the process control or the like, the density correction is carried out with respect to the other halftone processes B through E by calculating output correction values by conversion.

However, in a case where a conversion value is fixed and density characteristics of the halftone processes A through E change over time or a property of an apparatus is not in conformity with a commonly set conversion value, a density characteristic assumed when the conversion value is set and an actual density characteristic may not match.

According to the image processing section 20 in accordance with the present embodiment, for example, in a case where a density abnormality occurs in a printed image due to a change over time in density characteristics of the other halftone processes B through E, the density correction adjustment section 33 receives an instruction from the user, so as to rewrite, in accordance with the instruction, conversion values which (i) are associated with the other halftone processes in which the density abnormality has occurred and (ii) are stored in the conversion value table.

Figure 6:
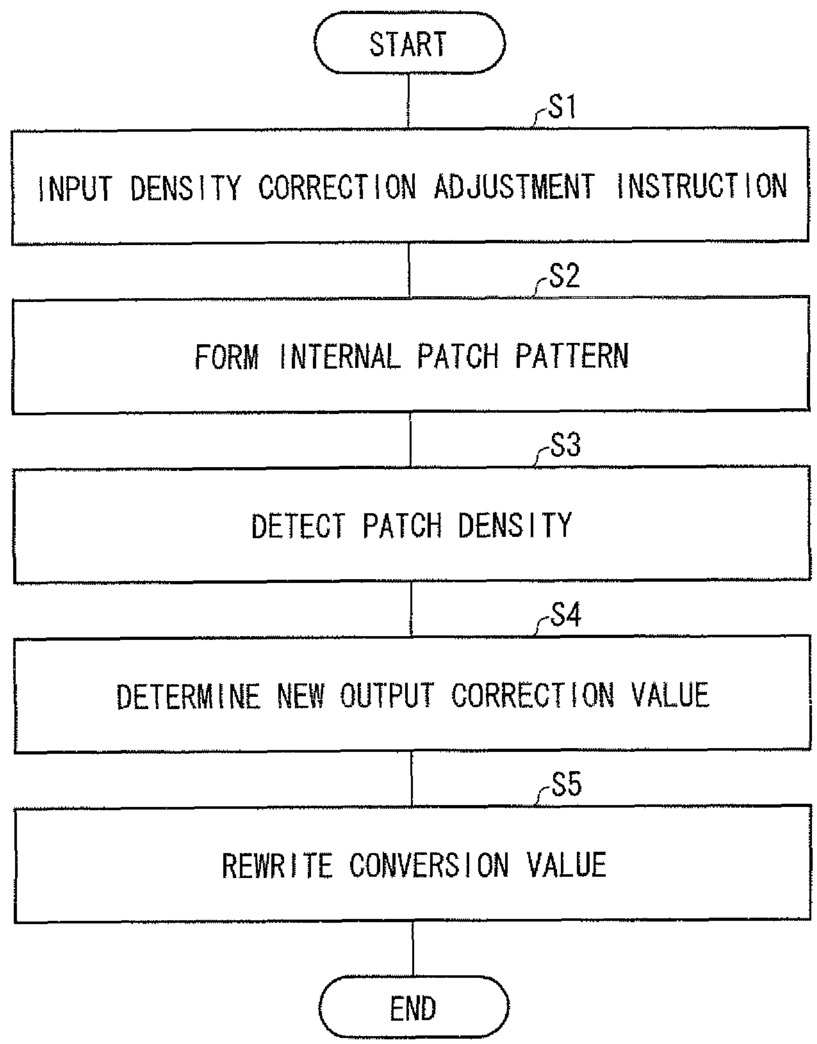
FIG. 6 is a flow chart illustrating how the image processing section illustrated in FIG. 1 carries out a density correction adjustment process when a density adjustment instruction is given to the other halftone processes.

FIG. 6 is a flow chart illustrating how the image processing section 20 carries out the density correction adjustment process when the density adjustment instruction is given to the other halftone processes. For example, in a case where a density abnormality occurs in the halftone process C, which is one of the other halftone processes, the user inputs, into the instruction input section 41, the instruction to carry out the density correction adjustment with respect to the halftone process C (S1) (see FIG. 6).

When the density correction adjustment section 33 receives the instruction inputted at S1, the actual measurement instruction section 37 gives the instruction to the internal patch formation instruction section 34 via the output correction value actual measurement section 31. The internal patch formation instruction section 34 generates a command to form an internal patch pattern subjected to the halftone process C, so as to give the command to the image forming section 42. The image forming section 42 which has obtained the command mainly controls the image forming stations to form, on the intermediate transfer belt 61, the internal patch pattern subjected to the halftone process C (S2).

The sensor 21 detects a patch density of the internal patch pattern formed on the intermediate transfer belt 61 at S2 (S3). The density correction adjustment section 33 retrieves a patch which is identical in density to each patch detected by the sensor and is stored in the sensor output value storage section 24, so as to determine, as a correct output correction value of the halftone process C, an output value used to form the retrieved patch (S4). Then, the conversion value calculation section 36 and the conversion value table update section 39 of the density correction adjustment section 33 rewrite the conversion values in accordance with the new output correction value thus determined (S5). Equations (5) and (6) by which the conversion values of the other halftone processes are reviewed are described below.

When a conversion value is a ratio:

new conversion value (ratio)=new output correction value of other halftone process found by actual measurement/reference output correction value of reference halftone process (5)

When a conversion value is a difference:

new conversion value (difference)=new output correction value of other halftone process found by actual measurement−reference output correction value of reference halftone process (6)

As described above, an output correction value of the halftone process C whose adjustment in the output correction value table has been instructed is also rewritten when the density correction adjustment process is carried out. Note here that the output correction value can be rewritten in the output correction value table by using a new output correction value found by actual measurement as it is or by recalculating a conversion output correction value by use of a new conversion value.

As described earlier, in a case where a conversion value is rewritten for each of the other halftone processes in which an abnormality occurs, it is possible to carry out a density correction more properly in accordance with a change over time in density characteristic of a halftone process and/or an individual difference between apparatuses, as compared with a conventional case in which a density correction is carried out by use of a conversion value which is not rewritten and is fixed.

Therefore, according to the image processing section 20, it is possible to make the image forming apparatus 100 which (i) prevents a reduction in accuracy with which a density correction is carried out by conversion with respect to a halftone process and (ii) enables expression of proper halftone.

The following description discusses how the density adjustment process is carried out when the density adjustment instruction is given to the reference halftone process.

Figure 7:
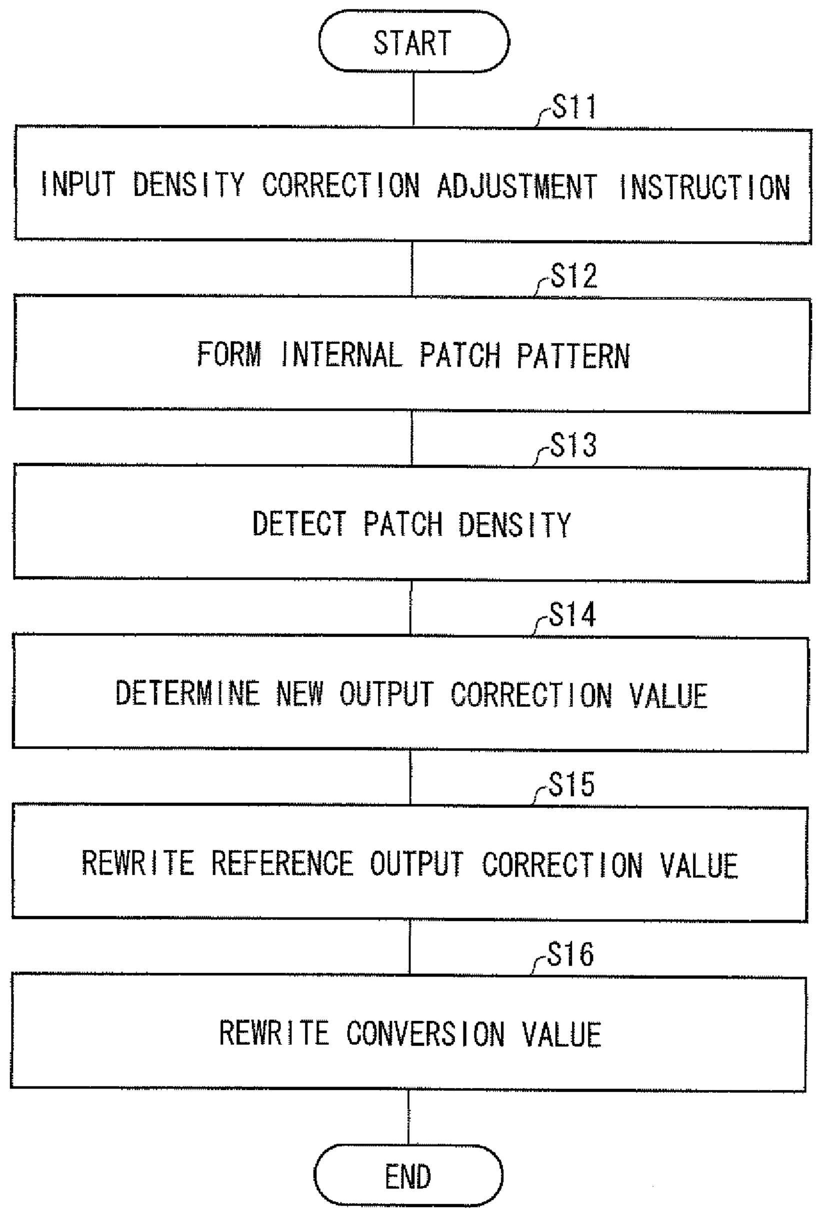
FIG. 7 is a flow chart illustrating how the image processing section illustrated in FIG. 1 carries out the density correction adjustment process when the density adjustment instruction is given to a reference halftone process.

FIG. 7 is a flow chart illustrating how the image processing section 20 carries out the density correction adjustment process when the density adjustment instruction is given to the reference halftone process. In a case where a density abnormality occurs in the reference halftone process A, the user inputs, into the instruction input section 41, the instruction to carry out the density correction adjustment with respect to the reference halftone process A (S11) (see FIG. 7).

When the density correction adjustment section 33 receives the instruction inputted at S11, the actual measurement instruction section 37 gives the instruction to the internal patch formation instruction section 34 via the output correction value actual measurement section 31. The internal patch formation instruction section 34 generates a command to form an internal patch pattern subjected to the reference halftone process A, so as to give the command to the image forming section 42. The image forming section 42 which has obtained the command mainly controls the image forming stations to form, on the intermediate transfer belt 61, the internal patch pattern subjected to the halftone process A (S12).

The sensor 21 detects a patch density of the internal patch pattern formed on the intermediate transfer belt 61 at S12 (S13). The density correction adjustment section 33 retrieves a patch which is identical in density to each patch detected by the sensor and is stored in the sensor output value storage section 24, so as to determine, as a correct output correction value of the reference halftone process A, an output value which is used to form the retrieved patch (S14). Then, the conversion value calculation section 36 and the conversion value table update section 39 of the density correction adjustment section 33 rewrite the reference output correction value stored in the output correction value table (S15), and rewrite the conversion values of the other halftone processes B through E in accordance with the new reference output correction value thus determined (S16).

Equations (7) and (8) by which the conversion values of the other halftone processes are reviewed are described below.

When a conversion value is a ratio:

$$\text{new conversion value}=\text{old conversion value}\times\text{old reference output correction value}/\text{new reference output correction value} \quad (7)$$

When a conversion value is a difference:

$$\text{new conversion value}=\text{old conversion value}+\text{old reference output correction value}-\text{new reference output correction value} \quad (8)$$

As described above, in a case where the density adjustment instruction is given to the reference halftone process A and the reference output correction value is reviewed, the density correction adjustment section 33 calculates new conversion values by use of the equations (7) and (8) so that the output correction values calculated by conversion by the output correction value conversion section 32 are identical before and after the reference output correction value is rewritten. Then, the conversion value table update section 39 rewrites the conversion value table in accordance with the new conversion values.

According to this, it is possible to respond to a density abnormality in the reference halftone process A while maintaining the output correction values of the other halftone processes B through E.

As described earlier, according to the image processing section 20 in accordance with the present embodiment, the density correction adjustment section 33 can review, in accordance with the instruction from the user, the conversion value table stored in the conversion value table storage section 22. Therefore, it is possible to carry out a density correction more properly in accordance with a change over time in density characteristics of the other halftone processes B through E and/or an individual difference between apparatuses, as compared with a conventional case in which a density correction is carried out by use of a conversion value which cannot be rewritten and is fixed.

Therefore, according to the image processing section 20, it is possible to make the image forming apparatus 100 which enhances an accuracy with which a density correction is carried out by conversion with respect to a halftone process.

Note that the present embodiment uses a conversion value table in which a conversion parameter is a conversion value. However, the present invention is not limited to this. For example, an arithmetic expression can be used as the conversion parameter.

Second Embodiment

A second embodiment of the present invention is described below with reference to FIGS. 8 and 9. The present embodiment is to discuss an image forming apparatus which carries out a plurality of halftone processes, the image forming apparatus being arranged such that the number of reference halftone processes is not set to one and the image forming apparatus includes an image processing section which can change the reference halftone processes according to need.

Note that for convenience, members having functions identical to those of the respective members illustrated in the drawings of the First Embodiment are given respective identical reference numerals, and a description of those members is omitted here.

The First Embodiment discussed a case where in the image forming apparatus 100 which carries out a plurality of halftone processes, a density correction is carried out by setting one of the plurality of halftone processes as a reference halftone process and appropriately rewriting conversion values of the other halftone processes.

However, a change of reference halftone processes enables an output adjustment which is more suitable for a user's mode of use. For example, in a case where one of the plurality of halftone processes which is used most frequently is changed to a reference halftone process, it is possible to more properly express halftone of an image formed by the reference halftone process.

Figure 8:
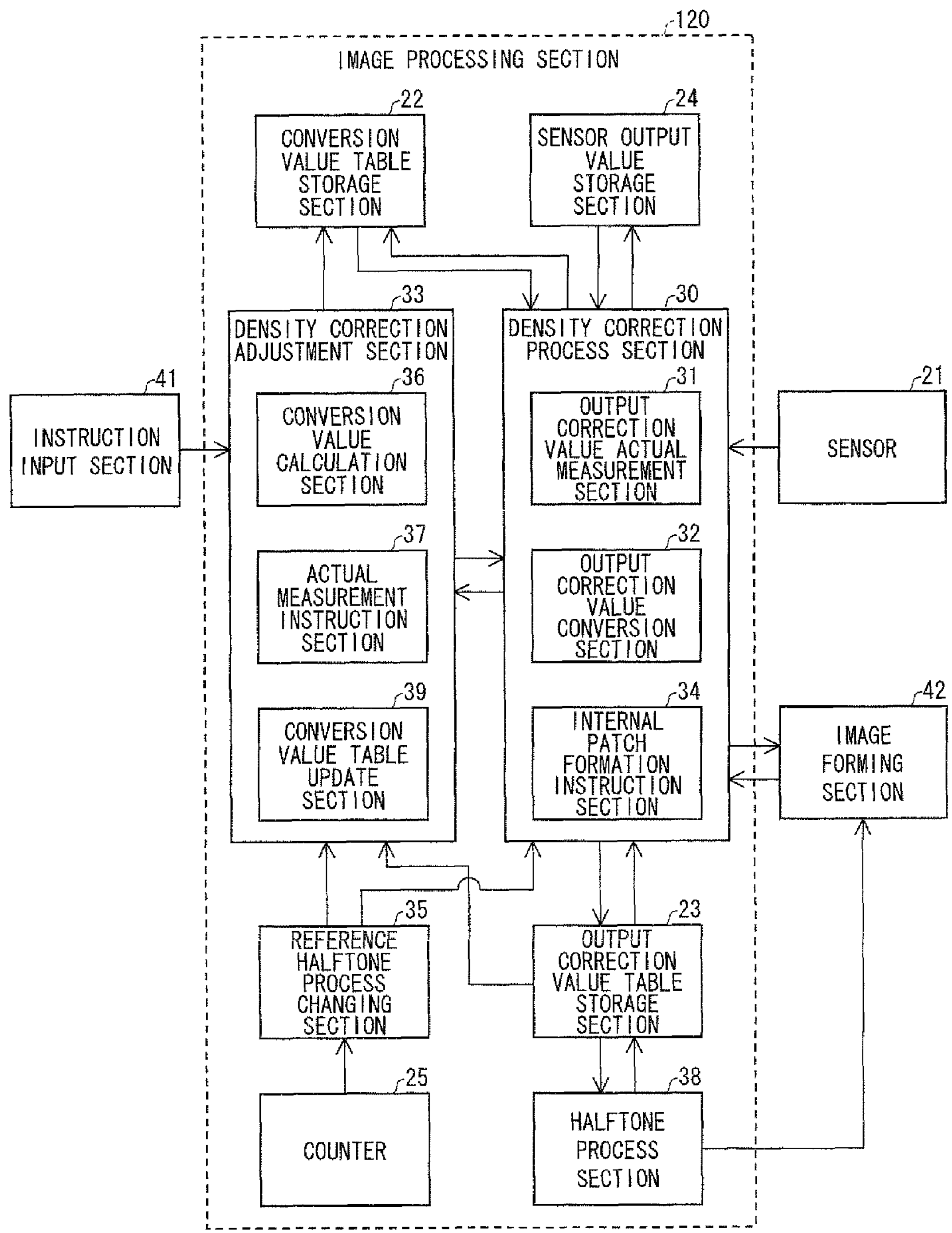
FIG. 8 is a block diagram illustrating an example of an arrangement of an image processing section in accordance with another embodiment of the present invention.

FIG. 8 is a block diagram illustrating an example of an arrangement of an image processing section 120 in accordance with the present embodiment. The image processing section 120 further includes a counter (a counting section) 25 and a reference halftone process changing section 35 in addition to members of the image processing section 20 described in the First Embodiment.

The counter 25 measures a frequency of use of the plurality of halftone processes in a given period.

The reference halftone process changing section 35 selects a halftone process from the plurality of halftone processes and changes the selected halftone process to a reference halftone process in accordance with an instruction from the user or the frequency of use measured by the counter 25.

Note that the other members of the image processing section 120 are identical to those of the image processing section 20 described in the First Embodiment and a description thereof is omitted here.

The following description discusses how the image processing section 120 carries out the reference halftone process changing process. Note that as in the case of the First Embodiment, the image forming apparatus of the present embodiment is arranged such that five halftone processes A through E are carried out and the halftone process A is set as a reference halftone process.

Figure 9:
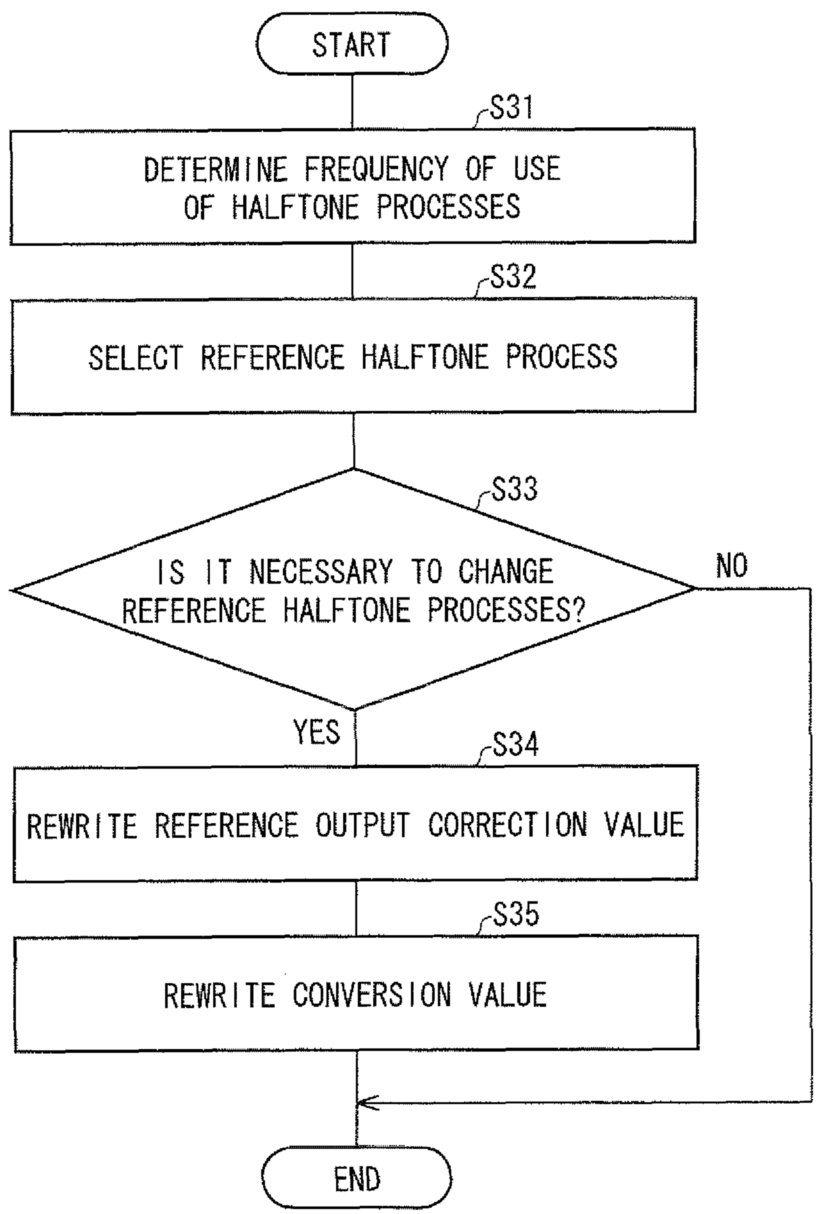
FIG. 9 is a flow chart illustrating how the image processing section illustrated in FIG. 8 carries out a reference halftone process changing process.
Figure 10:
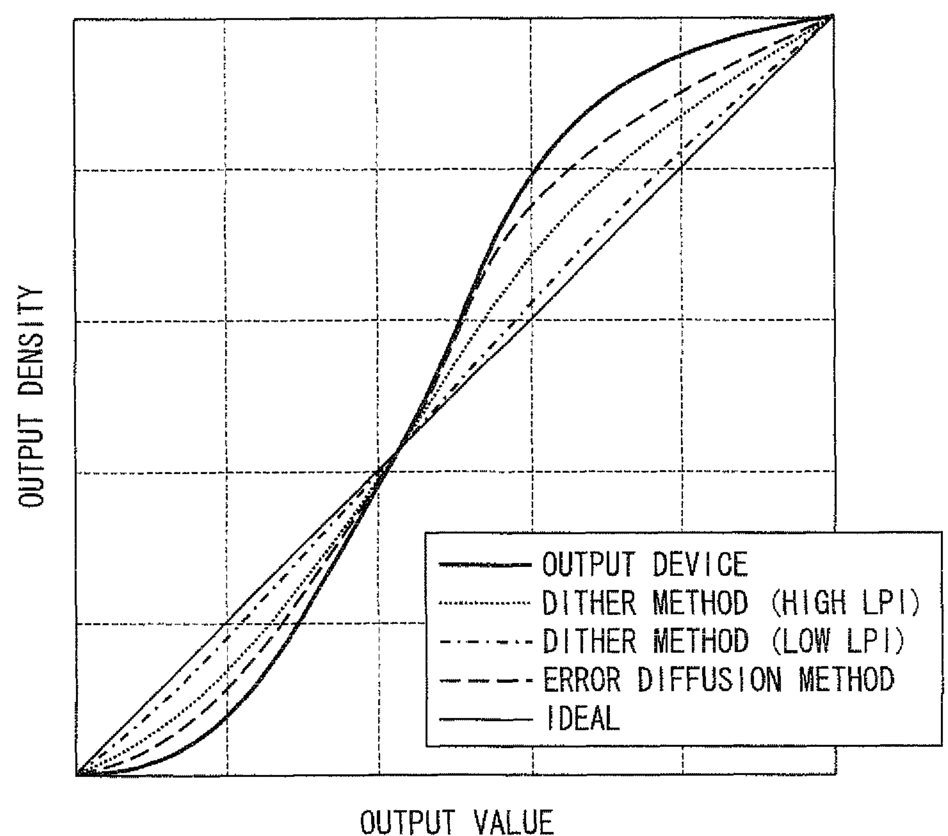
FIG. 10 is a graph illustrating density characteristics of respective halftone processes.

FIG. 9 is a flow chart illustrating how the image processing section 120 carries out the reference halftone process changing process. First, the reference halftone process changing section 35 determines a frequency of use of the halftone processes A through E in a given period, the frequency having been measured by the counter 25 (S31) (see FIG. 9).

In accordance with the frequency of use determined at S31, the reference halftone process changing section 35 selects, as a reference halftone process, a halftone process which is used most frequently (S32).

Next, the reference halftone process changing section 35 determines whether or not it is necessary to rewrite the reference halftone process (S33), Specifically, the image processing section 120 determines whether or not a reference halftone process set at the time of the determination by the reference halftone process changing section 35 and the halftone process selected at S32 are identical (S33).

In a case where it is unnecessary to rewrite the reference halftone process (NO at S33), i.e., in a case where the reference halftone process set at the time of the determination by the reference halftone process changing section 35 and the reference halftone process selected at S32 are identical, the reference halftone process changing section 35 finishes carrying out the reference halftone process changing process.

In contrast, in a case where it is necessary to rewrite the reference halftone process (YES at S33), i.e., in a case where the reference halftone process set at the time of the determination by the reference halftone process changing section 35 and the reference halftone process selected at S32 are not identical, the reference halftone process changing section 35 rewrites a reference output correction value stored in a conversion value table (S34). For example, in a case where the halftone process C is used most frequently, the reference halftone process changing section 35 sets the halftone process C as a new reference halftone process instead of the halftone process A, so as to rewrite the conversion value table.

Specifically, the reference halftone process changing section 35 calculates a reference output correction value of the halftone process C by calculating a difference between a reference output correction value (an output correction value table) of the halftone process A and a conversion value (the conversion value table) of the halftone process C.

Next, the reference halftone process changing section 35 not only sets a conversion value of the halftone process A but also rewrites conversion values (S35). Specifically, the reference halftone process changing section 35 rewrites the conversion values by calculating conversion values with respect to the reference output correction value of the halftone process C for the other halftone processes A, B, D, and E. A process carried out in this case is substantially identical to that carried out at S16 in the flow chart illustrated in FIG. 7.

As described earlier, according to the image processing section 120 in accordance with the present embodiment, it is possible to not only review registered conversion values but also change reference halftone processes. Therefore, a density correction is carried out in which a halftone process that is used most frequently by the user is a reference halftone process. This allows implementation of an optimum density correction process in accordance with a user's mode of use.

Note that, though the present embodiment discussed an arrangement in which a halftone process that is used most frequently is selected to be changed to a reference halftone process, the present invention is not limited to this. For example, the present invention can be arranged such that reference halftone processes are not changed in a case where a difference between a frequency of use of a reference halftone process set at the time of determination whether or not it is necessary to rewrite the reference halftone process and a frequency of use of the halftone process that is used most frequently is less than a threshold which is separately set.

Note also that, though the present embodiment discussed an arrangement in which the counter 25 is provided and reference halftone processes are changed in accordance with a frequency of use measured by the counter 25, the present invention is not limited to this. For example, the present invention can be arranged such that no counter 25 is provided and a reference halftone process changing process is carried out in accordance with a reference halftone process changing instruction inputted into an instruction input section 41.

Summary of Embodiments

The image forming apparatus in accordance with the embodiments having a function of carrying out a plurality of halftone processes, the image forming apparatus includes: a density correction process section for carrying out a density correction process with respect to the plurality of halftone processes; and a density correction adjustment section for adjusting the density correction process carried out by the density correction process section, the density correction process section finding an output correction value of a reference halftone process of the plurality of halftone processes by use of a result of measurement of densities of respective patches of a patch pattern subjected to the reference halftone process, and finding an output correction value of at least one of the plurality of halftone processes which is other than the reference halftone process by conversion from the output correction value of the reference halftone process by use of a conversion parameter set for the at least one halftone process, the density correction adjustment section receiving an instruction to adjust the density correction process carried out by the density correction process section and reviewing the conversion parameter used by the density correction process section, so as to adjust the density correction process.

According to the arrangement, the density correction adjustment section receives an instruction to adjust the density correction process carried out by the density correction process section and reviews the conversion parameter used by the density correction process section, so as to adjust the density correction process.

According to this, also for a halftone process using a conversion parameter, the conversion parameter can be reviewed properly in accordance with a change over time in density characteristic of the halftone process and/or an individual difference between apparatuses. This enables enhancement of a density correction accuracy.

Therefore, according to the embodiments, it is possible to make an image processing apparatus which carries out a density correction process with higher accuracy even by use of conversion as compared with a conventional arrangement in which a density correction process is carried out by use of a conversion parameter (a conversion value or a conversion expression) which cannot be rewritten and is fixed.

The image processing apparatus in accordance with the embodiments can be arranged such that: the density correction adjustment section includes: a first output correction value actual measurement section for, in response to an instruction to adjust a halftone process of the plurality of halftone processes which is other than the reference halftone process, finding an output correction value of the halftone process by use of a result of measurement of densities of respective patches of a patch pattern subjected to the halftone process whose adjustment has been instructed; a first conversion parameter calculation section for, in accordance with (i) the output correction value found by the first output correction value actual measurement section and (ii) the output correction value of the reference halftone process already found by the density correction process section, finding a new conversion parameter for the halftone process whose adjustment has been instructed; and a first conversion parameter update section for updating a conversion parameter of the halftone process whose adjustment has been instructed to the new conversion parameter calculated by the first conversion parameter calculation section.

According to the arrangement, in response to an instruction to adjust a halftone process of the plurality of halftone processes which is other than the reference halftone process, a first output correction value actual measurement section gives an instruction to form a patch pattern subjected to the halftone process whose adjustment has been instructed, so as to find an output correction value of the halftone process by actual measurement.

After the output correction value has been found by actual measurement, in accordance with (i) the output correction value found by actual measurement and (ii) the output correction value of the reference halftone process already found by the density correction process section, a first conversion parameter calculation section finds a new conversion parameter for the halftone process whose adjustment has been instructed, and a first conversion parameter update section updates a conversion parameter of the halftone process whose adjustment has been instructed to the new conversion parameter calculated by the first conversion parameter calculation section.

According to this, it is possible to easily make an image processing apparatus in which for a halftone process using a conversion parameter to carry out a density correction process, the conversion parameter can be reviewed properly in accordance with a change over time in density characteristic of the halftone process and/or an individual difference between apparatuses in response to an instruction to adjust the density correction process carried out by the halftone process.

The image processing apparatus in accordance with the embodiments can be arranged such that: the density correction adjustment section includes: a second output correction value actual measurement section for, in response to an instruction to adjust the reference halftone process of the plurality of halftone processes, finding an output correction value of the reference halftone process by use of the result of the measurement of the densities of the respective patches of the patch pattern subjected to the reference halftone process; a second conversion parameter calculation section for finding new conversion parameters for all the halftone processes having conversion parameters in accordance with (i) the output correction value of the reference halftone process found by the second output correction value actual measurement section, (ii) the output correction value of the reference halftone process already found by the density correction process section, and (iii) predetermined conversion parameters so that an output correction value found by conversion from the output correction value of the reference halftone process found by the second output correction value actual measurement section is identical to an output correction value found by conversion from the output correction value of the reference halftone process already found by the density correction process section; and a second conversion parameter update section for updating the conversion parameters of all the halftone processes to the new conversion parameters calculated by the second conversion parameter calculation section.

According to the arrangement, in response to an instruction to adjust the reference halftone process of the plurality of halftone processes, a second output correction value actual measurement section gives an instruction to form a patch pattern subjected to the reference halftone process, so as to find an output correction value of the reference halftone process by actual measurement.

After the output correction value of the reference halftone process has been found by actual measurement, a second conversion parameter calculation section finds new conversion parameters for all the halftone processes having conversion parameters in accordance with (i) the output correction value of the reference halftone process found by the second output correction value actual measurement section, (ii) the output correction value of the reference halftone process already found by the density correction process section, and (iii) predetermined conversion parameters, and a second conversion parameter update section updates the conversion parameters of all the halftone processes to the new conversion parameters calculated by the second conversion parameter calculation section.

Note here that the second conversion parameter calculation section finds the new conversion parameters so that an output correction value found by conversion from the output correction value of the reference halftone process found by the second output correction value actual measurement section is identical to an output correction value found by conversion from the output correction value of the reference halftone process already found by the density correction process section.

According to this, in a case where an adjustment instruction is given to the reference halftone process, it is possible to adjust only the density correction process carried out by the reference halftone process while conversion parameters of the other halftone processes, which do not need to be adjusted, are rewritten so that output values of the other halftone processes remain unchanged before and after the reference halftone process is adjusted.

The image forming apparatus in accordance with the embodiments can be arranged to further include a reference halftone process changing section which enables a change of reference halftone processes in the density correction process section.

According to the arrangement, a reference halftone process changing section enables a change of reference halftone processes in the density correction process section. Therefore, it is possible to not only review a conversion parameter but also change, in accordance with user's needs, reference halftone processes in which a density correction process is carried out in accordance with actual measurement.

The image forming apparatus in accordance with the embodiments can be arranged to further include: a counting section for measuring a frequency of use, in a given period, of the plurality of halftone processes, each being a possible reference halftone process, the reference halftone process changing section setting, as a reference halftone process, a halftone process of the plurality of halftone processes whose frequency of use measured by the counting section is the highest.

According to the arrangement, a counting section measures a frequency of use, in a given period, of the plurality of halftone processes, each being a possible reference halftone process, and the reference halftone process changing section sets a halftone process of the plurality of halftone processes whose frequency of use is the highest as a reference halftone process whose output correction value is found by the density correction process section by use of a result of measurement of densities of respective patches of a patch pattern.

This allows a density correction process to be carried out in accordance with actual measurement with respect to a halftone process which is used by the user most frequently. Therefore, it is possible to carry out a density correction process which further meets user's needs.

The image forming apparatus in accordance with the embodiments can be arranged such that the conversion parameter is a conversion value. The image forming apparatus in accordance with the embodiments can be arranged such that the conversion value is a difference from or a ratio to the output correction value of the reference halftone process.

An image forming apparatus includes an image processing apparatus mentioned above.

According to the arrangement, it is possible to make an image forming apparatus in which a density correction is carries out with higher accuracy in a halftone process using conversion.

Note that it is possible to cause a computer to implement an image processing apparatus mentioned above. In this case, (i) a program for causing the computer to implement a multifunction printer by causing the computer to operate as each section of the image processing apparatus and (ii) a computer-readable recording medium in which the program is recorded are both encompassed in the scope of the present embodiment.

The present invention is not limited to the description of the embodiments above, but may be altered by a skilled person within the scope of the claims. An embodiment based on a proper combination of technical means disclosed in different embodiments is encompassed in the technical scope of the present invention.

Finally, each block of an image processing apparatus and an image forming apparatus can be implemented by a hardware logic or by software by use of a CPU as below.

Namely, each of an image processing apparatus and an image forming apparatus includes (i) a CPU (central processing unit) which executes a command of a control program that implements each function of the image processing apparatus and the image forming apparatus, (ii) a ROM (read only memory) in which the control program is stored, (iii) a RAM (random access memory) which extracts the control program, (iv) a storage device (a recording medium) such as a memory in which the control program and various sets of data are stored, and (v) the like. The object of the present invention is attainable by supplying, to the image processing apparatus and the image forming apparatus, a recording medium in which program codes (an executable program, an intermediate code program, and a source program) of a control program of a density correction process section 30 which is software that implements the each function are computer-readably recorded and causing a computer (or a CPU or an MPU) of each of the image processing apparatus and the image forming apparatus to read out and carry out the program codes recorded in the recording medium.

Examples of the recording medium include (i) tapes such as a magnetic tape and a cassette tape, (ii) disks including magnetic disks such as a Floppy (Registered Trademark) disk and a hard disk, and optical disks such as a CD-ROM, an MO, an MD, a DVD, and a CD-R, (iii) cards such as an IC card (including a memory card) and an optical card, and (iv) semiconductor memories realized by a mask ROM, EPROM, EEPROM, a flash ROM, and the like.

Each of the image processing apparatus and, the image forming apparatus can be connected to a communication network, via which the program codes can be supplied to the image processing apparatus and the image forming apparatus. Such a communication network is not particularly limited. Examples of the communication network includes the Internet, an intranet, an extranet, a LAN, ISDN, VAN, a CATV communications network, a virtual private network, a telephone network, a mobile telecommunications network, and a satellite communication network. A transmission medium of which a communication network is composed is not particularly limited. Examples of the transmission medium includes wired transmission media such as IEEE1394, a USB, a power-line carrier, a cable TV circuit, a telephone line, and ADSL and wireless transmission media such as infrared communication systems such as IrDA and a remote controller, Bluetooth (Registered Trademark), 802.11 wireless communication system, HDR, a mobile phone network, a satellite circuit, and a digital terrestrial network. Note that the present invention can also be realized in a form of a computer data signal in which the program codes are embodied by an electronic transmission and which is embedded in carrier waves.

INDUSTRIAL APPLICABILITY

The present invention can be used for various image forming apparatuses such as a multifunction printer (MFP).

REFERENCE SIGNS LIST

20 Image processing section (Image processing apparatus)
22 Conversion value table storage section
23 Output correction value table storage section
24 Sensor output value storage section
25 Counter (Counting section)
30 Density correction process section (Density Correction Process Section)
31 Output correction value actual measurement section (First output correction value actual measurement section, Second output correction value actual measurement section)
32 Output correction value conversion section

33 Density correction adjustment section (Density correction adjustment section)

34 Internal patch formation instruction section

35 Reference halftone process changing section (Reference halftone process changing section)

36 Conversion value calculation section

37 Actual measurement instruction section (First output correction value actual measurement section, Second output correction value actual measurement section)

38 Halftone process section

39 Conversion value table update section (Conversion Parameter Update Section)

100 Image forming apparatus

120 Image processing section (Image processing apparatus)

The invention claimed is:

1. An image processing apparatus having a function of carrying out a plurality of halftone processes, the image processing apparatus comprising:

a density correction process section for carrying out a density correction process with respect to the plurality of halftone processes; and a density correction adjustment section for adjusting the density correction process carried out by the density correction process section, the density correction process section finding an output correction value of a reference halftone process of the plurality of halftone processes by use of a result of measurement of densities of respective patches of a patch pattern subjected to the reference halftone process, and finding an output correction value of at least one of the plurality of halftone processes which is other than the reference halftone process by conversion from the output correction value of the reference halftone process by use of a conversion parameter set for the at least one halftone process, the density correction adjustment section receiving an instruction to adjust the density correction process carried out by the density correction process section and reviewing the conversion parameter used by the density correction process section, so as to adjust the density correction process, wherein the density correction adjustment section includes:

a first output correction value actual measurement section for, in response to an instruction to adjust the reference halftone process of the plurality of halftone processes, finding an output correction value of the reference halftone process by use of the result of the measurement of the densities of the respective patches of the patch pattern subjected to the reference halftone process;

a first conversion parameter calculation section for finding new conversion parameters for all the halftone processes having conversion parameters in accordance with (i) the output correction value of the reference halftone process found by the first output correction value actual measurement section, (ii) the output correction value of the reference halftone process already found by the density correction process section, and (iii) predetermined conversion parameters so that an output correction value found by conversion from the output correction value of the reference halftone process found by the first output correction value actual measurement section is identical to an output correction value found by conversion from the output correction value of the reference halftone process already found by the density correction process section; and a first conversion parameter update section for updating the conversion parameters of all the halftone processes to the new conversion parameters calculated by the first conversion parameter calculation section.

2. The image processing apparatus as set forth in claim 1, wherein:

the density correction adjustment section includes:

a second output correction value actual measurement section for, in response to an instruction to adjust a halftone process of the plurality of halftone processes which is other than the reference halftone process, finding an output correction value of the halftone process by use of a result of measurement of densities of respective patches of a patch pattern subjected to the halftone process whose adjustment has been instructed;

a second conversion parameter calculation section for, in accordance with (i) the output correction value found by the second output correction value actual measurement section and (ii) the output correction value of the reference halftone process already found by the density correction process section, finding a new conversion parameter for the halftone process whose adjustment has been instructed; and a second conversion parameter update section for updating a conversion parameter of the halftone process whose adjustment has been instructed to the new conversion parameter calculated by the second conversion parameter calculation section.

3. The image processing apparatus as set forth in claim 1, further comprising a reference halftone process changing section which enables a change of reference halftone processes in the density correction process section.

4. The image processing apparatus as set forth in claim 3, further comprising:

a counting section for measuring a frequency of use, in a given period, of the plurality of halftone processes, each being a possible reference halftone process, the reference halftone process changing section setting, as a reference halftone process, a halftone process of the plurality of halftone processes whose frequency of use measured by the counting section is the highest.

5. The image processing apparatus as set forth in claim 1, wherein the conversion parameter is a conversion value.

6. The image processing apparatus as set forth in claim 5, wherein the conversion value is a difference from or a ratio to the output correction value of the reference halftone process.

7. An image forming apparatus comprising an image processing apparatus recited in claim 1.

8. A non-transitory computer-readable recording medium in which a program is recorded for causing a computer to function as each section of an image processing apparatus recited in claim 1.

* * * * *